United States Patent [19]

Brant et al.

[11] Patent Number: 4,741,945

[45] Date of Patent: May 3, 1988

[54] AUTOMOTIVE TRIM PANEL

[75] Inventors: Angela L. Brant, West Chester, Pa.; Ahid D. Nashif, Cincinnati, Ohio

[73] Assignee: Arco Chemical Company, Newtown Square, Pa.

[21] Appl. No.: 892,164

[22] Filed: Jul. 30, 1986

[51] Int. Cl.$^4$ .......................... B32B 3/24; B32B 3/26; B60R 13/02

[52] U.S. Cl. ..................... 428/158; 428/166; 428/286; 428/291; 428/304.4; 428/314.8; 428/316.6; 296/39 A; 296/211; 296/214

[58] Field of Search ............... 428/304.4, 314.4, 316.6, 428/314.8, 158, 166, 340, 286, 291; 296/39 A, 211, 214

[56] References Cited

U.S. PATENT DOCUMENTS

| | | | |
|---|---|---|---|
| 3,126,978 | 3/1964 | Bergstrom | 428/316.6 |
| 3,160,549 | 12/1964 | Caldwell et al. | 428/352 |
| 3,985,198 | 10/1976 | Kurtze et al. | 428/314.8 |
| 4,042,746 | 8/1977 | Hofer | 428/314.4 |
| 4,083,595 | 4/1978 | Maier | 296/39 A |
| 4,172,918 | 10/1979 | Doerer | 428/174 |
| 4,211,590 | 7/1980 | Steward et al. | 428/314.4 |
| 4,263,356 | 4/1981 | Nomura et al. | 428/316.6 |
| 4,340,129 | 7/1982 | Salyers | 428/316.6 |

Primary Examiner—John E. Kittle
Assistant Examiner—Beth A. Bozzelli
Attorney, Agent, or Firm—Dennis M. Kozak

[57] ABSTRACT

The acoustical performance of automotive trim panels is improved, especially with respect to noise generated by structural vibration of an automobile and synchronous vibration of the trim panel itself, by positioning a dead, vibration-damping, foam material between the automobile frame and a semi-flexible support layer of the trim panel, the trim panel also including an open-celled, flexible, airborne sound-absorbing foam layer bonded to the opposing face of the support layer, and wherein the dead foam material has a substantially lower resilience value and a substantially higher recovery rate than the open-celled foam layer.

23 Claims, 2 Drawing Sheets

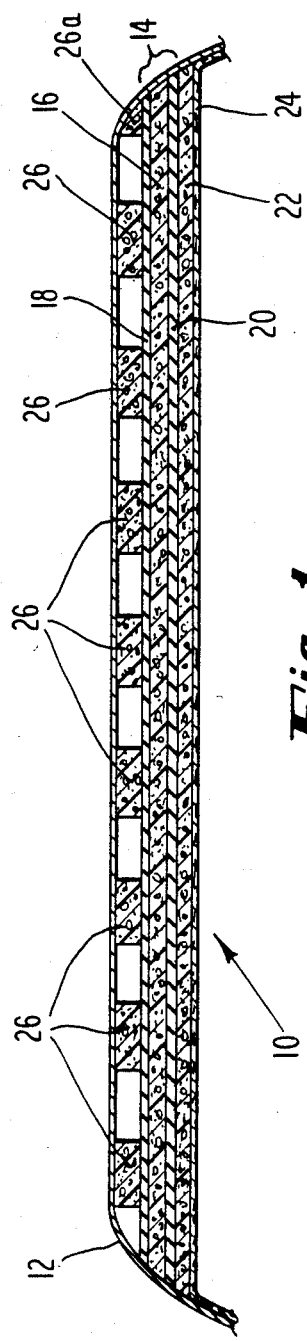
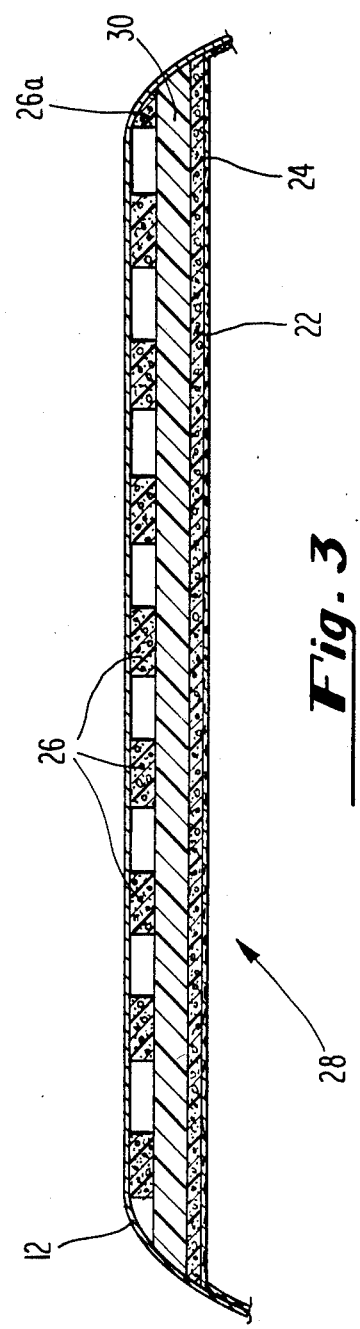

AUTOMOTIVE TRIM PANEL

TECHNICAL FIELD

This invention relates to trim panels commonly used to cover interior surfaces of automotive vehicles. Typical of such panels are the headliners and wall liners of automobiles which not only improve appearance, safety and temperature control but also absorb sound, thereby contributing to driving pleasure.

BACKGROUND OF THE INVENTION

Modern trim panels are generally laminar composites which can be contoured for attachment to the interior metal framing of an automotive vehicle, particularly by "snap-in" techniques, as by temporarily flexing a panel for insertion of peripheral edges into trim channels and then permitting the panel to straighten. The panel thus becomes self supporting. Typically, such panels are used as headliners to cover the underside of metal roof panels but they are also used as coverings for wall panels, sometimes affixed with screws, clips or other mechanical fasteners.

As described in the technical and patent literature, such as U.S. Pat. Nos. 4,172,918 to Doerer and 4,256,797 to Stamper et al., trim panels combine decorative appearance with sound insulation, temperature control, concealment of imperfections, heat resistance to avoid sag and blistering, and sufficient flexibility, resilience and strength to withstand handling during thermoforming and installation and to be self-supporting (non-fluttering) after installation. Generally, no single material will provide all of the required qualities together with acceptable cost and therefore trim panels normally are laminar composites which combine the properties of the individual layers such that the deficiencies of any one layer are offset by the benefits of one or more other layers. For example, a layer which provides good sound absorption often will not have sufficient strength and resistance to bending to enable it to be installed by the "snap-in" technique.

Accordingly, the aforementioned patents describe laminar composites based upon a relatively semi-flexible or stiff substrate sheet or core to which are bonded on one or both sides a foam layer and a decorative layer to provide the desired sound absorbing and aesthetic qualities. Nevertheless, it has been found that although the foregoing composites are effective for absorbing airborne noise originating from the engine, wind, weather conditions, the road or other exterior or interior sources, they are not highly effective in reducing noise which is developed within the headliners themselves by reason of acoustical excitation or resonance induced by structural vibration of an automotive frame, such as occurs when rain, wind, engine vibrations and/or rough road conditions cause an automobile roof or frame, covered by a trim panel, to vibrate. In fact, studies have shown that the better the quality of the support layer used in the trim panel, the greater the tendency of the trim panel to vibrate. For example, the higher strength, stiffer support material used in the trim panels of the foregoing patents is more easily excited and radiates noise more efficiently than a glass fiber support material. However, the weaker glass fiber material is subject to sag unless supported by another material.

As will become apparent from the discussion below, the problem of reducing noise generated by a trim panel via automobile structural vibration is not resolved merely by introducing any vibration damping material between the trim panel and the metal frame of the automobile which is subject to vibration. The damping material must have certain characteristics which cooperate with the properties of other layers and materials used in the trim panel construction for proper balance of the totality of qualities desired.

SUMMARY OF THE INVENTION

It has now been found that noise generated by structural vibration of an automobile frame, which vibration excites an acoustical response in trim panels containing a semi-flexible support layer, can be substantially reduced or eliminated by a laminar composite wherein an open-celled, flexible, primary sound-absorbing foam layer is bonded to one face of the support layer, and a dead, vibration damping, secondary sound-absorbing foam material is bonded to the opposing face of the support layer. The damping material is adapted for affixing to the metal frame of an automobile (such as the underside of roof panels) and is "dead" relative to the primary sound-absorbing foam layer, i.e., it is characterized by a substantially lower resilience value and a substantially higher recovery rate than the primary sound-absorbing foam layer.

In another aspect of the invention, the placement of the damping material is significant for optimizing the damping and sound absorption. In still another aspect of the invention, an outer decorative finish sheet is bonded to the exposed face of the primary sound-absorbing foam layer.

DESCRIPTION OF THE DRAWINGS

FIG. 1 is a fragmentary, transverse, vertical sectional view of a headliner form of a trim panel of the invention, shown installed adjacent to the underside of the steel roof of an automotive vehicle;

FIG. 3 is a sectional view similar to FIG. 1 showing another embodiment of a trim panel of the invention in contact with the underside of the metal roof of an automotive vehicle.

DETAILED DESCRIPTION

Figure 2A:
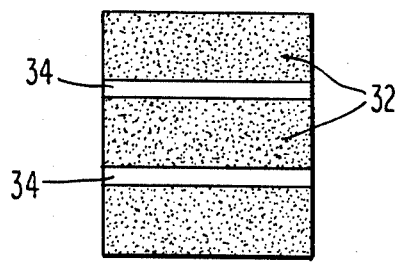
FIGS. 2a–2f are diagramatic, plan views of the dead foam component of trim panels of the invention, taken from the underside of the metal roof of an automotive vehicle, illustrating typical placements of the dead foam material to form a damping layer.
Figure 2D:
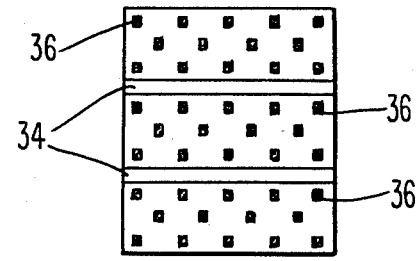

With reference to FIG. 1 of the drawings, one embodiment of a trim panel of the invention is shown in the form of a headliner 10. The headliner 10 is affixed by any suitable means known in the art to the underside of the metal roof panel 12 of an automobile. Typically, affixing is by snap-in of the total headliner 10 by flexing of the headliner sufficient to insert the panel edges into channels or flanges (not shown) provided around the periphery of the underside of the roof. For this purpose, the headliner 10 may either be preformed to fit the contour of the roof or it may be trimmed at the manufacturing site for appropriate engagement with the channels or flanges. The headliner also may be preformed or trimmed to accommodate dome lights, visor mounts, ducts or other projections or openings required in the headliner. Of course, other means of affixing may be employed, such as adhesives or mechanical elements, as is well known in the art.

In one embodiment, the trim panel 10 is a laminar arrangement (known in the trade as a foam-sheet laminate or "FSL") of a semiflexible support layer 14 comprising, for example, a thermoplastic polymer foam core layer 16 interposed between and bonded to sheets or films 18 and 20 of the same or different thermoplastic polymer. The primary characteristics of the support layer 14 are good tensile strength and some flexibility but sufficient stiffness to resist bending, so that it will provide good support for the other layers of the headliner 10 and facilitate snap-in installation. Generally, the stiffness ($K_b$) should be greater than about 5 lbs-in$^2$ calculated by $K_b=EI$ where E is the flexural modulus in psi as determined by ASTM D-790 and I is the moment of inertia, in.$^4$. Films 18 and 20 typically are imperforate thermoplastic films of about 3–60 mils thickness and the foam core layer 16 typically is a thermoplastic, closed cell foam having a thickness of about 1/32–1 inch and a density of about 3–6 lbs per cubic foot.

Preferably, the sheets or films 18 and 20 have a higher impact resistance than the foam core material 16 in order to withstand handling during the thermoforming of the layers into the composite support layer 14 and trim panel 10, and during subsequent installation. For example, whereas the polymeric foam material of the core 16 should have a tensile strength of at least 2500 psi, preferably at least 7800 psi, as determined by ASTM D-638 and a tensile modulus of at least $1.0 \times 10^5$ psi, preferably at least $4.5 \times 10^5$ psi, the polymeric films or sheets 18 and 20 may have tensile strengths and moduli of about the same or somewhat less than that of the foam core material but an Izod impact strength of at least 0.5 ft.lbs/in., preferably at least 3.2 ft.lbs/in., as measured by ASTM D-256.

The foam core 16 may comprise any suitable thermoplastic closed cell foam having the properties recited above. Suitable foams include those produced from styrenic polymers such as polystyrene and acrylonitrile-butadiene-styrene, polycarbonate, acrylic and vinyl polymers and copolymers, and the like. Particularly suitable for use as foam core 16 is the styrenic foam produced from a styrene/maleic anhydride copolymer sold under the trademark Dylark TM 232 by ARCO Chemical Company, division of Atlantic Richfield Company.

The sheets or films 18 and 20 may be formed from any suitable thermoplastic polymer or copolymer possessing the properties recited above. Suitable thermoplastic polymers or copolymers include styrenic polymers such as styrene/maleic anhydride, styrene/N-arylmaleimide (e.g. N-phenylmalemide), maleic anhydride, alpha-methyl styrene/maleic anhydride, alpha-methyl styrene/N-arylmalemide, alpha-methyl styrene/N-arylmaleimide/maleic anhydride, and the like. Optionally, the thermoplastic polymers or copolymers can be impact modified, typically with a rubber. Particularly suitable for use as films or sheets 18 or 20 is a rubber-modified styrene/maleic anhydride copolymer designated DYLARK 250 Resin commercially available from ARCO Chemical Company.

Other FSL type layer 14 composites include polyester fiber mats as sheets 18 and 20 with a styrene/maleic anhydride copolymer direct injection foam as core material 16, sold under the trademark FIBERCORE by Sackner Products, Inc., Grand Rapids, Mich.; and glass fiber as sheets 18 and 20 with a rigid urethane foam interlayer 16, sold under the trademark TRAMIVEX by Van Dresser Ltd., Troy, Mich.

Other physical and chemical characteristics of preferred materials comprising the foam core layer 16 and the thermoplastic films or sheets 18 and 20 of the embodiment of FIG. 1 and methods of manufacture are described generally and in detail in the Stamper et al U.S. Pat. No. 4,256,797 cited above, the disclosure of which is incorporated herein by reference, and reference is made to that patent for further details.

The headliner 10 further includes an open-celled, flexible, resilient, sound-absorbing foam layer 22 bonded to one face of the support layer 14. Preferably, foam layer 22 is a soft, compressible urethane foam, such as a polyester urethane material which protects the support layer 14 and conceals any imperfections. Typically, foam layer 22 will have a soft feel and a thickness of about 40–750 mils, preferably about 60–500 mils. Its density may range from about 1 to about 8 lbs/cu.ft. (pcf), preferably about 1 to 4 pcf, and is characterized by virtually instant recovery upon compression. Latex foams, such as the crushed acrylic foams described in U.S. Pat. Nos. 3,901,240 and 4,061,822, are also suitable.

Foam layer 22 may be bonded to support layer 14 with an adhesive, optionally by solvent bonding or heat sealing. The foam layer 22 may be produced by any of the techniques well known in the art, such as molding, extrusion in a flat sheet of the desired thickness followed by thermoforming to the correct contour, or by extrusion in sheet form followed by compression molding. The foam layer may also be perforated to improve its sound absorbing properties and appearance.

Optionally, a decorative finish layer 24 may be bonded to the exposed face of support layer 14, that is, to sheet 22. The decorative finish layer 24 may comprise a coating or sheet incorporating various designs and fabrics both woven or nonwoven, and may also comprise a pigmented or embossed film. In place of a separate sheet or coating, the layer 24 may also comprise a decorative treatment directly on the surface of sheet or film 22. Such decorative layers or treatments are conventional and are described in the technical literature, such as in U.S. Pat. Nos. 4,172,918 and 4,256,797.

The trim panel 10 lastly includes a dead, vibration damping, foam material 26 and 26a in contact with support layer 14. For success of the material 26 in damping both the vibration of roof member 12 and support layer 14, the latter vibration sometimes resulting from synchronous excitation by the roof member 12, the foam material 26 must have a substantially lower resilience value and a substantially higher recovery rate than the foam layer 22. Typically, the dead foam material will have a ball rebound resilience value, as measured by ASTM D-3574-81, Test H, of about 2–10% as contrasted with about 40–50% for foam layer 22, and a recovery rate (time to recover after 2 hours at 80% compression) of about 120–300 seconds as contrasted with less than about 30 seconds for foam layer 22. In addition to the aforementioned viscoelastic properties, foam material 26 should also have a high damping coefficient as reflected in a peak damping loss factor of at least 0.15, e.g., from about 0.15 to about 2.0, as determined by the vibrating beam technique, ASTM E 756-83.

Foam·material 26 is said to be "dead" in contrast to the high flexibility and resilience of foam layer 22. Deadness is achieved most effectively by utilizing a closed-cell, low air permeability foam or by over-indexing the chemical composition of a urethane foam (stoichiometric excess of NCO over active hydrogen reactant). Suitable foams for this purpose include urethane acrylic, bitumen filled polyether and vinyl types, such as the low permeability urethane foams available from the Recticel Corporation, the PVC alloy foams available from the E.A.R. Division of Cabot Corporation marketed as the E-A-R C-3002 series, foams available from Specialty Composites Company under the trademark and designation CONFOR C-40 or C-42, foams available from Creative Foam Corporation under the trademark and designation SENSIFOAM C-38, C-40 or C-42 and bitumen filled polyether foams available from Toyo Rubber Chemical under the trademark AS-PITCH. All of the foregoing foams exhibit slow viscoelastic responses and high damping coefficients.

The dead foam material 26 may be installed in contact with both the support layer 14 and the underside of the metal roof panel 12 by means of an adhesive or, in case of contact with the support layer, by solvent or heat sealing. Material 26 may also be maintained in contact with the automobile roof 12 by compression between the support layer 14 and the underside of the roof. Preferably, material 26 is made integral with support layer 14 by adhesion prior to installation of the entire trim panel.

Figure 2B:
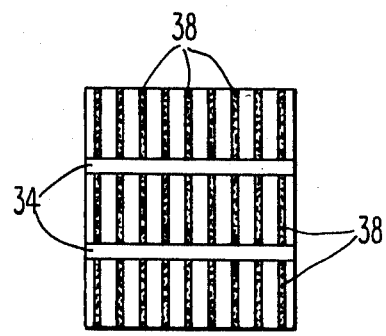
Figure 2E:
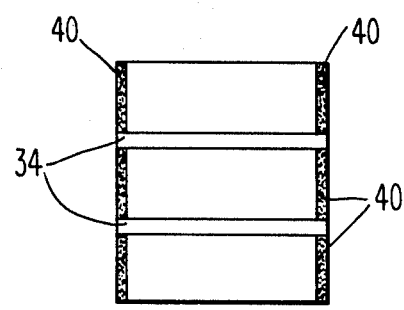
Figure 2C:
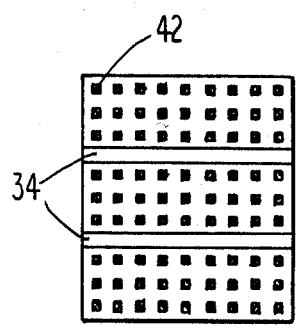
Figure 2F:
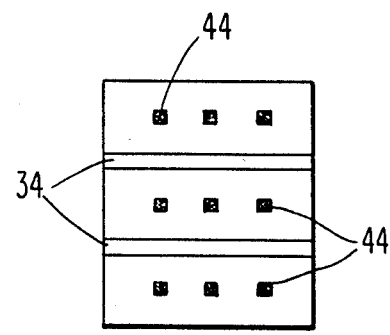

Various patterns of placement of the damping material 26 are illustrated in FIGS. 2a-2f and some characteristics thereof are summarized in Table 1 appended. FIG. 2a shows essentially complete coverage of the underside of a metal roof typically covering, as indicated in Table 1, the entire area between metal ribs 34. The dead foam material may also be positioned as strips 38 as shown in FIG. 2b (corresponding to the configurations of FIGS. 1 and 3), as close-packed blocks 42 (FIG. 2c), as more spatially arranged blocks 36 (FIG. 2d), as widely displaced strips 40 (FIG. 2e), or as a small number of squares 44 as shown in FIG. 2f. Generally, the dead foam material may comprise from about 6 to 100% of the substrate 14, best results being achieved when the dead foam material covers at least 15% of the support layer 14.

FIG. 3 shows another embodiment of the trim panel of the invention. In this embodiment, a trim panel such as a headliner 28 has generally the same laminar construction as in the configuration 10 of FIG. 1 except for a support layer 30 constructed of a single material such as hardboard, a glass fiber mat (such as a netted material which is impregnated with a thermosetting resin) and compressed to a variable thickness of about 3-20 mm or a stiff, closed-cell urethane foam material. The several layers of headliner 28 may be bonded together with adhesives, or solvent treatment, in the same manner as in headliner 10 of FIG. 1.

It will be apparent to those skilled in the art that numerous other materials, construction and configurations may be substituted for the known materials, constructions and configurations illustrated in the drawings and as described above, for equivalent functions and purposes, and the invention therefore is not limited to those specifically described.

EXPERIMENTAL RESULTS

Various headliner configurations were tested in place in automobiles to compare performance. In an acoustic excitation test, a loudspeaker was placed in the rear seat of the passenger side of the automobile with a microphone placed directly in front of the speaker. Another microphone was placed near the driver's right ear for the response pickup. This test measured the ability of the headliner to absorb internal (air-transmitted) noise. In a structural excitation test, the metal roof of the automobile was excited structurally by a shaker attached to the corner of the roof. The noise generated was picked up by the microphone placed at the driver's right ear. This procedure thus measured noise inside a car which in actual experience might be due to vibration of the roof caused by wind, rain, the engine or other sources, and also measured reflected noise from vibration of the headliner itself induced by the roof vibrations. It was determined that the majority of the noise due to vibration of the roof occurred between 200 and 1000 Hz although zoom bands of 400 to 800 Hz were used to obtain test results from 0 to 10,000 Hz.

Table 2 (appended) summarizes test results for various headliner constructions relative to a control (no headliner) and individual components of a headliner. When considering the test results, it should be appreciated that a noise level change of +3 dB represents a doubling of noise at the driver's ear, whereas a noise level change of −3 dB represents a halving of noise at the driver's ear. No test results are shown for noise generated by acoustic excitation because such noise can be absorbed effectively either by increasing the thickness of the soft foam layer 22 (FIGS. 1, 3) or by soft trim in the vehicle such as carpeting and upholstery.

Table 2 shows substantial differences in suppression of noise from structural vibration. The test results for the glass fiber construction are misleading because although the sound level reduction was −5 decibels (dB), this was due to the superior ability of the glass fiber to absorb the noise rather than to excitation thereof by the structural vibrations. However, glass fiber alone is not effective as a support in a headliner construction because it does not have sufficient strength, especially for snap-in installation. In time, such materials tend to sag. The FSL-I construction showed a 3 dB noise reduction which improved to 4 dB when felt damping pads were installed between the FSL construction and the roof. Slighter improvement (−3.5 dB) resulted from the use of thin rubber damping pads. The FSL-II construction also showed some improved noise reduction as compared to the control, but it was only when the FSL-I and FSL-II panels were combined with a low resilience, dead foam material A, B or C, that substantial improvements over use of the laminate headliner constructions alone were observed. Table 2 also relates the noise reduction to the damping layer placements illustrated in FIGS. 2a-2f.

The test results accordingly show that structural vibration is a substantial source of noise, that headliners based upon support layers having the stiffness required for snap-in installation are themselves excited acoustically by the structural vibrations, and that both such vibrations may be substantially reduced along with the resultant noise by combining the known laminar headliner constructions with a dead, vibration-damping foam material having the characteristics recited and the configurations illustrated.

While the invention has been illustrated and described in what are considered to be the most practical and preferred embodiments, it will be recognized that many variations are possible and come within the scope thereof, the appended claims therefore being entitled to a full range of equivalents.

TABLE 1

Damping Layer Placement

| FIG. | Area Covered Between Ribs (in$^2$) | Area Covered (%) | Description |
|---|---|---|---|
| 2a | 1224 | 100 | complete coverage |
| 2b | 648 | 53 | 9–12" × 2" strips/panel |
| 2c | 405 | 33 | 27–2.5" × 2" blocks/panel |
| 2d | 205 | 16.7 | 14–2.5" × 2" blocks/panel |
| 2e | 144 | 11.7 | 2–12" × 2" strips/panel |
| 2f | 81 | 6.6 | 3–3" squares/panel |

TABLE 2

Noise Reduction In Car Subjected to Structural Vibration

| Headliner Construction | Coverage (%) | Sound Level (dB) |
|---|---|---|
| None | | 0 |
| Glass fiber[1] | | −5 |
| FSL-I[2] | | −3 |
| FSL-I/felt pads (6 mm thick) | | −4 |
| FSL-I/thin rubber pads (2.5 mm thick) | | −3.5 |
| FSL-II | | −4 |
| FSL-I/low resilience foam A[4] | | −5.5 |
| FSL-I/low resilience foam B[5] | 6.6(FIG. 2f) | −3 |
| FSL-I/low resilience foam B | 11.7(FIG. 2e) | −3.5 |
| FSL-I/low resilience foam B | 16.7(FIG. 2d) | −4.5 |
| FSL-I/low resilience foam B | 33.0(FIG. 2c) | −4.5 |
| FSL-I/low resilience foam B | 53.0(FIG. 2b) | −5.5 |
| FSL-I/low resilience foam B | 100.0(FIG. 2a) | −7.5 |
| FSL-I/low resilience foam C[6] | | −7.0 |
| FSL-II/low resilience foam A | | −5.5 |
| FSL-II/low resilience foam B | 53.0(FIG. 2b) | −5.5 |
| FSL-II/low resilience foam B | 100.0(FIG. 2a) | −7.5 |
| FSL-II/low resilience foam C | | −8 |

[1]Commercial glass fiber batting impregnated with curing agent, variable bulk thickness = 6–20 mm, weight = 830 g/m$^3$.
[2]Styrene/maleic anhydride foam (DYLARK 232, ARCO Chemical Co.) between two extruded sheets of impact modified styrene/maleic anhydride polymer (DYLARK 250, ARCO Chemical Company).
[3]Styrene/maleic anhydride foam between two polyester fiber mats (Fibercore laminate, Sachner Products, Inc.).
[4]Urethane foam, I.D. No. 162503A, Recticel Corporation.
[5]PVC alloy film C-3002-50, E-A-R Division, Cabot Corporation, Indianapolis, Ind.
[6]High impact energy absorpton rate urethane foam (SENSIFOAM C-38, Creative Foam Corporation, Fenton, Mich.)

We claim:

1. A laminar, automotive trim panel having improved acoustical performance, said panel comprising a semi-flexible support layer enabling snap-in mounting of the panel on an automobile frame, an open-celled, flexible, sound-absorbing foam layer bonded to one face of the support layer, and a dead, vibration damping, foam material in contact with the opposing face of the support layer, wherein the dead foam material is capable of non-adhesive affixing to the metal of an automobile frame and has a substantially lower resilience value and a substantially higher recovery rate than the open-celled foam layer, said improved acoustical performance including reduction of sound produced by structural vibrations of the panel.

2. The trim panel of claim 1 wherein the dead foam material covers substantially the entire face of the support layer.

3. The trim panel of claim 1 wherein the open-celled, flexible, sound-absorbing foam layer is a polyurethane foam having a density of about 1–8 pcf.

4. The trim panel of claim 1 wherein the sound absorbing foam layer is a polyurethane foam having a density of about 1–4 pcf.

5. The trim panel of claim 1 further including an outer, decorative finish layer on the exposed face of the sound-absorbing foam layer.

6. The trim panel of claim 5 wherein the sound-absorbing foam layer has a ball rebound resilience value according to ASTM D3574-81, Test H, of about 40–50% and a recovery rate after 2 hours at 80% compression of less than about 30 seconds.

7. The trim panel of claim 1 wherein the support layer has a bending stiffness $K_b$ of at least 5 lb-in.$^2$ calculated by $K_b=EI$ where E is flexural modulus as determined by ASTM D-790 and I is the moment of inertia, in.$^4$; the open-celled, flexible, sound-absorbing foam layer has a density of about 1–8 pcf; and the dead foam material has a ball rebound resilience value according to ASTM D 3574-81, Test H, of about 2–10% and a recovery rate after 2 hours at 80% compression of about 120–300 seconds.

8. The trim panel of claim 7 further including an outer, decorative finish layer on the exposed face of the sound-absorbing foam layer.

9. The trim panel of claim 1 wherein the dead foam material is distributed over portions of the face of the support layer.

10. The trim panel of claim 9 wherein the dead foam material is distributed over 6–100% of the face of the support layer.

11. The trim panel of claim 9 wherein the dead foam material is distributed over at least about 15% of the face of the support layer.

12. The trim panel of claim 1 wherein the support layer has a bending stiffness ($K_b$) of at least 5 lb-in.$^2$ calculated by $K_b=EI$ where E is flexural modulus as determined by ASTM D-790 and I is the moment of inertia, in.$^4$.

13. The trim panel of claim 12 wherein the support layer is a laminate comprising a styrenic copolymer foam layer interposed between a plurality of polyester fiber mats.

14. The trim panel of claim 12 wherein the support layer is a laminate comprising a rigid polyurethane foam layer interposed between a plurality of glass fiber mats impregnated with a thermosetting resin.

15. The trim panel of claim 12 wherein the support layer is a laminate comprising a styrenic copolymer foam layer interposed between sheets of styrenic copolymer.

16. The trim panel of claim 15 wherein the styrenic polymer sheets comprise impact modified styrenic copolymer, styrene/N-arylmaleimide, styrene/N-arylmaleimide/maleic anhydride, alpha-methyl styrene/N-arylmaleimide or alpha-methyl styrene/N-arylmaleimide/maleic amhydride.

17. The trim panel of claim 15 wherein the styrenic polymer foam layer comprises polystyrene, acrylonitrite/butadiene/styrene or styrene/maleic anhydride, and the styrenic polymer sheets comprise impact modified polystyrene, styrene/N-arylmaleimide, styrene/N-arylmaleimide /maleic anhydride, alphamethyl styrene/N-arylmaleimide or alpha-methyl styrene/N-arykmaleimide/maleic anhydride.

18. The trim panel of claim 1 wherein the dead foam material has a ball rebound resilience value according to ASTM D3574-81, Test H, of about 2–10% and a recovery rate after 2 hours at 80% compression of about 120–300 seconds.

19. The trim panel of claim 18 wherein the dead foam material comprises a closed cell, low air permeable foam.

20. The trim panel of claim 19 wherein the dead foam material is a polyurethane foam.

21. The trim panel of claim 19 wherein the dead foam material is a vinyl foam.

22. The trim panel of claim 19 wherein the dead foam material is an acrylic foam.

23. The trim panel of claim 19 wherein the dead foam material is a bitumen filled polyether.

* * * * *